__

2,891,047

METAL CONTAINING POLYAZO DYESTUFFS

Fritz Suckfull, Leverkusen, Rolf Putter, Dusseldorf, and Horst Nickel, Koln-Stammheim, Germany, assignors to Farbenfabriken Bayer Aktiengesellschaft, Leverkusen, Germany, a corporation of Germany No Drawing. Application August 8, 1956
Serial No. 602,940

Claims priority, application Germany August 20, 1955

10 Claims. (Cl. 260—145)

The present invention relates to metal containing polyazo dyestuffs and to a process for their manufacture; more particularly it relates to metal containing polyazo dyestuffs of the following formula

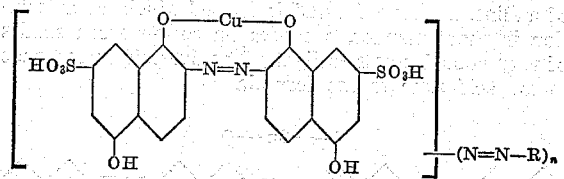

wherein R stands for a radical of an aromatic diazo compound and $n$ means the integer 1 or 2.

The new metal-containing polyazo dyestuffs are obtainable by coupling in usual manner one side or both sides of the copper complex of the azo compound of the formula

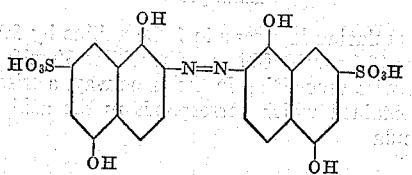

with aromatic diazo compounds; the coupling to both sides may be carried out with two different diazo compounds.

The copper-containing monoazo compound to be used as the azo component according to the invention may be prepared, for example, by the action of 2-diazo-1-hydroxy-5-O-benzene-sulfonyl-hydroxy-naphthalene-7 - sulfonic acid with an ammoniacal copper-(I)-salt solution; said copper complex of the 5,5'-dihydroxy-benzene-sulfonic acid ester is thereby formed with the splitting off of nitrogen; it is converted into the corresponding free dihydroxy compound by subsequent saponification in an alkaline medium.

If the diazo compounds used contain additional complex-forming groups such as the salicylic acid grouping or a complex-forming group in o-position to the diazo group, the copper complexes first obtained can be converted in substance or on the fibre by the action of metal-yielding agents into metal complexes containing more than one complex-combined metal atom per dyestuff molecule.

Diazo components suitable for the present invention are, for example, the following diazotized amines: anilines, o-amino-benzene-carboxylic acids, 1-amino-2-methoxy-benzenes, amines of the naphthalene series, 4-amino-azo-benzene-sulfonic acids, 4-amino-4'-nitrostilbene-2,2'-disulfonic acids and the like.

The aforesaid diazo components are only mentioned for the purpose of illustrating the process; they may be replaced by any other diazo component.

The products coupled on both sides can also be produced on the fibre by first dyeing a dyestuff coupled on one side according to the invention to the fibre and subsequently after-treating the dyeing thus obtained with a diazotized aromatic amine.

The new metal-containing polyazo dyestuffs are particularly suitable for the dyeing of vegetable fibres such as cotton and regenerated cellulose. In general, green shades are obtained which distinguish themselves by an outstanding fastness to light.

The following examples are given for the purpose of illustrating the invention, without, however, limiting it thereto; the parts by weight and the parts by volume being in the ratio of grams to millilitres.

Example 1

28.4 parts by weight (0.05 mol) of the copper complex of the azo dyestuff having the formula:

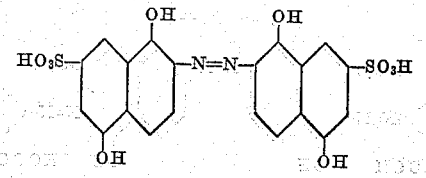

are dissolved in 2400 parts by volume of water and 28 parts by weight of sodium carbonate and combined at 0–5° C. with a diazo salt solution prepared from 9.3 parts by weight (0.1 mol) of aniline. When the coupling is completed, the trisazo dyestuff formed is separated by the addition of sodium chloride and isolated. It corresponds in the acid state to the formula

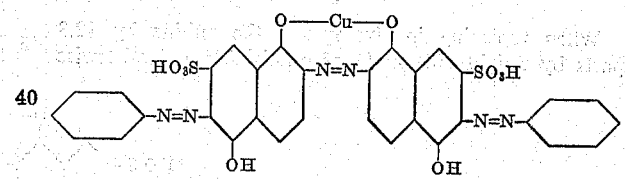

After drying, the dyestuff is a dark powder which dissolves in water with a green coloration. The trisazo dyestuff dyes cotton in green shades of outstanding fastness to light.

Example 2

28.4 parts by weight (0.05 mol) of the copper complex indicated in Example 1 as coupling component are dissolved in 2400 parts by volume of water and 28 parts by weight of soda and combined with a diazo salt solution prepared from 4.6 parts by weight (0.05 mol) of aniline. The disazo dyestuff separated with common salt corresponds in the acid state to the formula

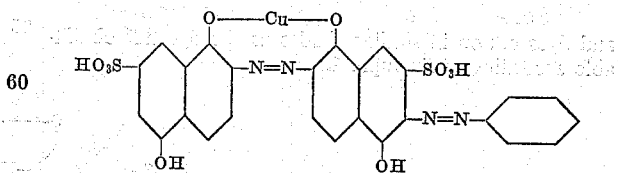

and is after drying a dark powder which dissolves in water with a greenish blue coloration. The greenish blue dyeing on cotton changes into a yellowish green upon after-treating on the fibre with a diazotized p-nitroaniline solution.

Example 3

To a one side coupled dyestuff obtained according to the instructions of Example 2 a diazo salt solution is added prepared from 7 parts by weight of 1-aminobenzene-2-carboxylic acid. The trisazo dyestuff formed is separated with sodium chloride and dried. It corresponds in the acid state to the formula

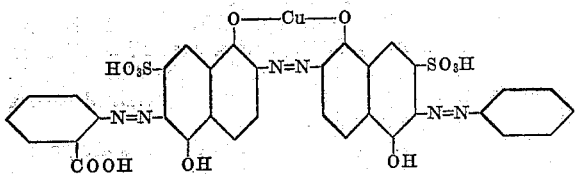

It dissolves in water with a green coloration and dyes cotton in green shades.

Example 4

When replacing in Example 1 the aniline by 14 parts by weight (0.1 mol) of 1-amino-benzene-2-carboxylic acid and otherwise proceeding in the same way, a trisazo dyestuff is obtained which corresponds in the acid state to the formula

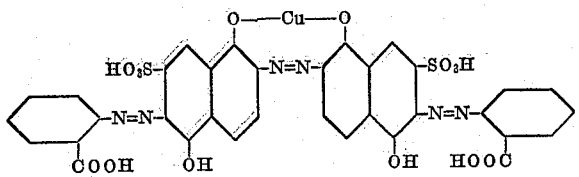

and dyes cotton in green shades of very good fastness to light.

The dyeings thus obtained can be after-treated on the fibre with copper salts.

Example 5

When replacing in Example 1 the aniline by 12.3 parts by weight (0.1 mol) of o-anisidine and otherwise proceeding in the same way, a trisazo dyestuff is obtained which corresponds in the acid state to the formula

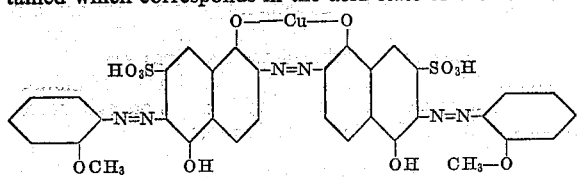

and dyes cotton in similar shades as the dyestuff obtainable according to Example 1.

If the dyestuff obtained according to this example is coppered in substance under de-alkylating conditions, a dyestuff is obtained which dyes cotton a little more bluish.

Example 6

If the aniline is replaced in Example 1 by 17.3 parts by weight (0.1 mol) of o-aminobenzene-sulfonic acid and otherwise the process is carried out in the same way, a very readily water-soluble trisazo dyestuff corresponding in the acid state to the formula

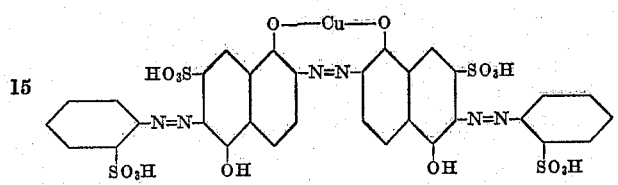

is obtained which dyes cotton in similar green shades as the dyestuff obtainable according to Example 1.

Example 7

If 22.5 parts by weight (0.1 mol) of 2-amino-naphthalene-8-sulfonic acid are used in Example 1 instead of aniline, a trisazo dyestuff is formed which, after isolation in usual manner, produces on cotton green shades of very good fastness to light. The dyestuff corresponds in the acid state to the formula

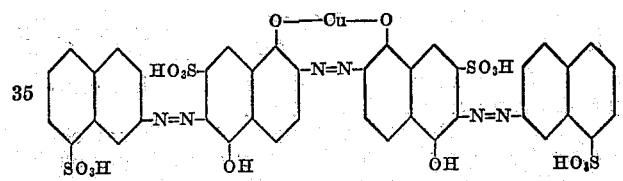

Example 8

When replacing in Example 1 the aniline by 30.6 parts by weight (0.1 mol) of N-acetylbenzidine-3'-sulfonic acid and otherwise proceeding in the same way, a trisazo dyestuff is obtained which corresponds in the acid state to the formula

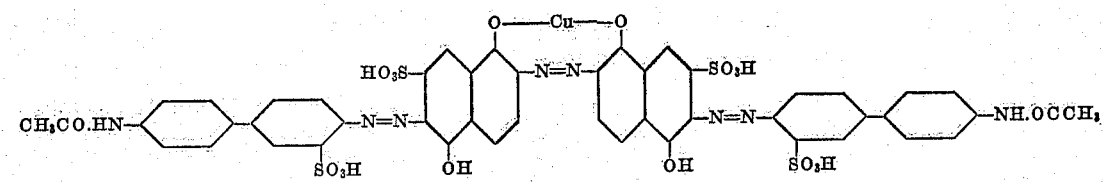

and which dyes cotton in bluish green shade.

Example 9

When replacing in Example 1 the aniline by 40 parts by weight (0.1 mol) of 4,4'-nitramino-stilbene-2,2'-disulfonic acid and otherwise proceeding in the same way, a trisazo dyestuff is formed which dyes cotton in olive-green shades of very good fastness to light. The dyestuff corresponds in the acid state to the formula

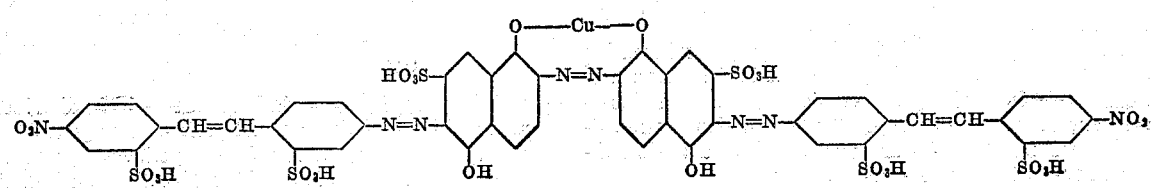

Example 10

When replacing in Example 1 the aniline by 27.7 parts by weight of 4-amino-azo-benzene-4'-sulfonic acid and otherwise proceeding in the same way, a pentakisazo dyestuff is obtained which corresponds in the acid state to the formula

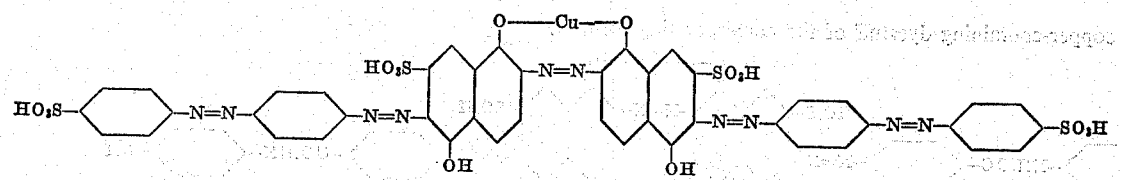

It dyes cotton in green shades.

Example 11

A solution of 28.4 parts by weight (0.05 mol) of the copper complex described as coupling component in Example 1, 28 parts by weight of sodium carbonate and 14 parts by weight of sodium hydroxide in 800 parts by volume of water and 80 parts by volume of formamide is combined at 0–5° C. with a diazo salt solution prepared from 15.4 parts by weight (0.1 mol) of 1-hydroxy-2-amino-4-nitrobenzene. When the coupling is completed, the trisazo dyestuff formed is isolated and dried. It corresponds in the acid state to the formula

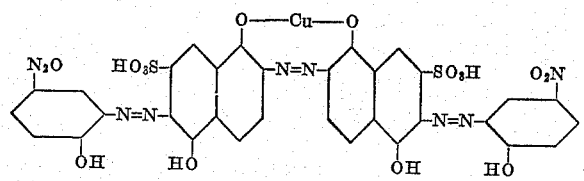

After drying it is a dark powder which dissolves in water with a grey coloration. It dyes coton in grey shades. The dyeings thus obtained can be after-treated with metal-yielding agents, e.g. copper or chromium salts.

Example 12

If 27.2 parts by weight (0.1 mol) of 1-(4'-aminobenzoylamino)-4-hydroxybenzene-3-carboxylic acid are used in Example 1 instead of aniline and otherwise proceeding in the same way, a trisazo dyestuff is obtained which corresponds in the acid state of the formula

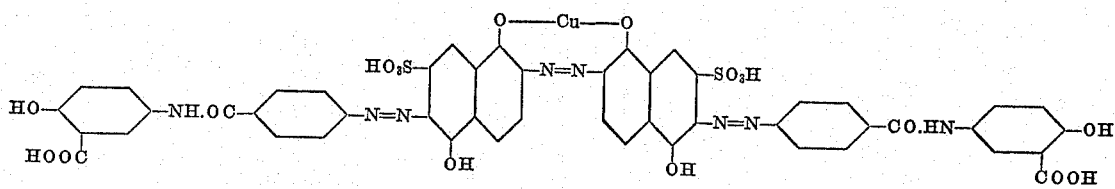

It dyes cotton in green shades fast to light. The dyeings possess very good wet-fastness properties and can be after-treated with metal-yielding agents, e.g. copper or chromium salts.

We claim:

1. A metal-containing polyazo dyestuff corresponding to the general formula

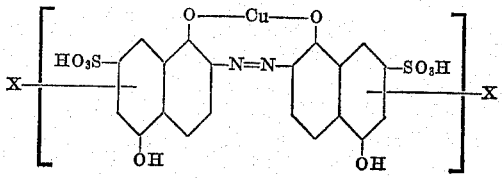

wherein each X is a member selected from the group consisting of hydrogen and an —N=N—R group, R being an aromatic radical selected from the group consisting of the benzene, naphthalene, stilbene, diphenyl and azo-benzene series, at least one X being an —N=N—R group.

2. A metal containing dyestuff of claim 1 wherein R is a radical of the benzene series.

3. A metal containing dyestuff of claim 1 wherein R is a radical of the naphthalene series.

4. A metal containing dyestuff of claim 1 wherein R is a radical of the stilbene series.

5. A dyestuff of claim 1 wherein R contains a metal complex forming group in o-position to the azo bridge.

6. A copper-containing dyestuff of the corresponding formula

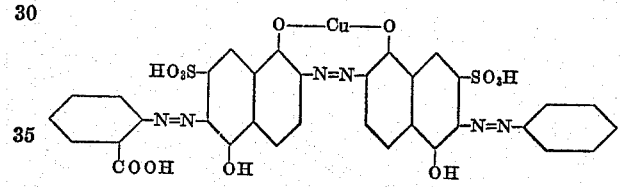

7. A dyestuff selected from the group consisting of copper-containing polyazo dyestuffs corresponding to the formula

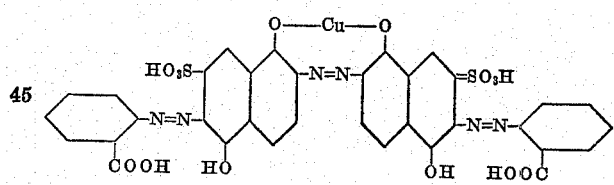

and the metal complexes thereof.

8. The copper-containing polyazo dyestuff corresponding to the formula

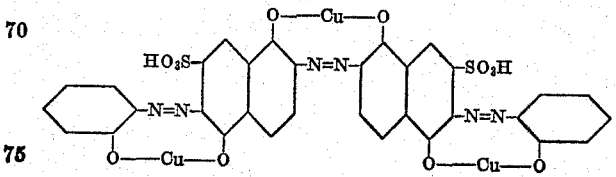

9. A copper-containing dyestuff of the corresponding formula
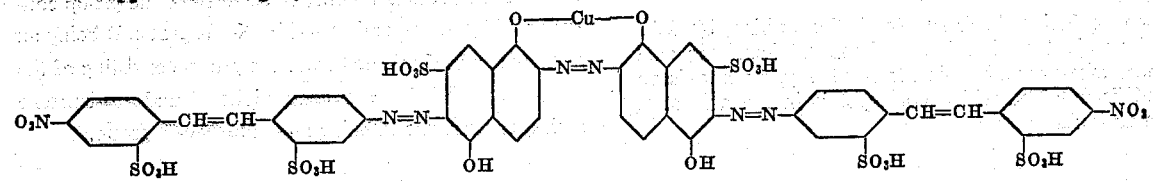
10. A copper-containing dyestuff of the corresponding formula
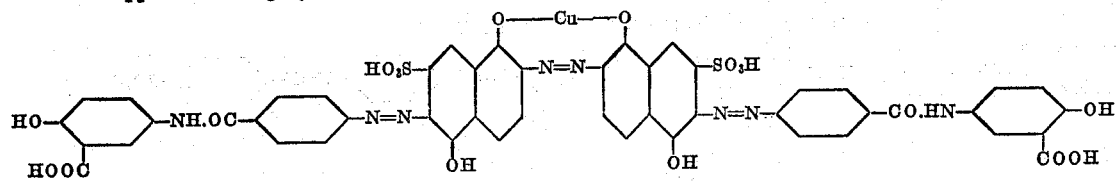
References Cited in the file of this patent
UNITED STATES PATENTS
| | | |
|---|---|---|
| 1,843,634 | Straub et al. | Feb. 2, 1932 |
| 2,644,813 | Ruckstuhl et al. | July 7, 1953 |
| 2,668,167 | Monnier | Feb. 2, 1954 |
| 2,737,510 | Ischer et al. | Mar. 6, 1956 |
| 2,779,756 | Riat | Jan. 29, 1957 |